(12) United States Patent
Kitchell

(10) Patent No.: US 8,297,416 B2
(45) Date of Patent: Oct. 30, 2012

(54) ROTOR DEVICE AND METHOD OF MAKING SAME

(76) Inventor: Edward W. Kitchell, South Kingstown, RI (US)

( * ) Notice: Subject to any disclaimer, the term of this patent is extended or adjusted under 35 U.S.C. 154(b) by 861 days.

(21) Appl. No.: 12/267,516

(22) Filed: Nov. 7, 2008

(65) Prior Publication Data

US 2010/0116603 A1    May 13, 2010

(51) Int. Cl.
*F16D 65/12* (2006.01)
(52) U.S. Cl. ............... 188/218 XL; 188/71.5; 188/71.6; 188/264 A; 188/264 AA; 188/26
(58) Field of Classification Search ............... 188/71.5, 188/71.6, 218 XL, 264 A, 264 AA, 26, 18 A
See application file for complete search history.

(56) References Cited

U.S. PATENT DOCUMENTS

| | | | |
|---|---|---|---|
| 380,660 A * | 4/1888 | Gakhar et al. ............. 407/29.15 |
| 1,493,237 A * | 5/1924 | Birkigt ...................... 192/107 R |
| 2,835,355 A | 5/1958 | Armstrong | |
| 2,850,118 A | 9/1958 | Byers | |
| 2,905,279 A * | 9/1959 | Moyer ..................... 188/218 XL |
| 2,987,143 A | 6/1961 | Culbertson et al. | |
| 3,403,758 A | 10/1968 | Stout | |
| 3,425,524 A | 2/1969 | Dewar | |
| 3,904,000 A * | 9/1975 | Berger ..................... 188/218 XL |
| 5,238,089 A * | 8/1993 | Matsuzaki et al. .......... 188/18 A |
| 5,524,518 A | 6/1996 | Sundstrom | |
| 5,555,788 A | 9/1996 | Gakhar et al. | |
| D380,660 S | 7/1997 | Gakhar et al. | |
| 5,758,561 A | 6/1998 | Curtsinger et al. | |
| 5,794,754 A * | 8/1998 | Villata ..................... 192/107 R |
| 5,850,895 A | 12/1998 | Evrard | |
| 5,896,800 A | 4/1999 | Curtsinger et al. | |
| D417,598 S | 12/1999 | Dibbern et al. | |
| 6,273,223 B1 | 8/2001 | Aloy | |
| 6,336,531 B1 | 1/2002 | Chou | |
| 6,371,252 B1 | 4/2002 | Kanehisa | |
| 6,688,206 B1 * | 2/2004 | Mummenhoff ................. 83/676 |
| 6,964,323 B2 * | 11/2005 | Campbell .................... 188/18 A |
| 6,974,275 B2 | 12/2005 | Nago et al. | |
| 7,097,422 B2 | 8/2006 | Rice et al. | |
| 7,156,010 B2 | 1/2007 | Asada | |
| 7,281,613 B2 | 10/2007 | Weiss | |
| 7,331,431 B2 | 2/2008 | Fischer et al. | |
| 2003/0056633 A1 * | 3/2003 | Baron et al. ..................... 83/665 |
| 2005/0252739 A1 * | 11/2005 | Callahan et al. ........ 188/218 XL |
| 2007/0187189 A1 * | 8/2007 | Takeuchi ........................ 188/26 |

FOREIGN PATENT DOCUMENTS

JP    59-117926    7/1984
JP    61-130634    6/1986

* cited by examiner

*Primary Examiner* — Bradley King
*Assistant Examiner* — Mahbubur Rashid
(74) *Attorney, Agent, or Firm* — Law Office of Peter G. Korytnyk, PLLC

(57) ABSTRACT

A rotor and a method of making same are provided. The rotor can include a substantially annular segment having a thickness defined between a first side surface and a second side surface, as well as an inner end edge surface and an outer end edge surface. At least one expansion groove can be formed in the substantially annular segment, and can include a substantially straight portion and a substantially curved portion. The substantially curved portion of the at least one expansion groove can form an arc of at least about 90 degrees. The rotor can also include at least one flange extending from an inner end edge surface of the substantially annular segment at an angle not parallel to a radial of the substantially annular segment.

38 Claims, 6 Drawing Sheets

ROTOR DEVICE AND METHOD OF MAKING SAME

FIELD OF THE INVENTION

The present teachings relate to a rotor device and a method of making same. More particularly, the present teachings relate to a rotor device for use in brake systems for vehicles, single or multiple friction disc systems for use in wet or dry vehicle clutch pack devices, or the like. The device can have one or more expansion grooves, one or more flanges, one or more lobes, and combinations thereof to resist or substantially prevent warping of the rotor.

BACKGROUND OF THE INVENTION

Rotors can be used in a variety of applications, including, for example, a brake system for a vehicle or a single or multiple friction disc for use in a clutching system for a transmission.

A brake system can use a brake rotor that can be mounted to a wheel hub and rotates with the wheel as the automobile moves. A brake pad is located on each side of the brake rotor in a plane parallel to the plane of the brake rotor. The brake pads are in a fixed position with respect to the brake rotor and wheel. To actuate the braking system, a hydraulic fluid is forced into a piston which presses the brake pads against the rotating brake rotor thereby slowing the wheel hub and wheel.

Similarly, a transmission can use a clutch pack assembly having one or more pressure rotors, similar to a brake rotor, and one or more friction discs, similar in function to brake pads. When the transmission is in "neutral," the pressure rotors are separated in space from the parallel friction discs. When the transmission is engaged, the pressure rotors contact the adjacent friction discs.

However, prior art metal rotors can be subject to significant and destructive amounts of friction during operation. In a demanding or extreme environment, for example, the friction created by the force of brake pads pressing against a brake rotor can generate enough heat to damage metal brake rotors. Heating of the brake rotor leads to expansion of the metal brake rotor. Excessive heat can lead to expansion of the metal rotor resulting in brake rotor deformation, also known as warping. Warping of the brake rotor can lead to drastically decreased brake performance because the contact area of brake pads to the brake rotor is decreased. Furthermore, the brake pedal of the braking system can pulsate or vibrate due to "kick-back" of the brake piston resulting from a warped metal rotor.

Expansion as a result of excessive heat build up in a metal pressure rotor used in a clutching system can also cause deformation and warping that result in a reduction of a pre-engineered clearance between the pressure rotor and the adjacent friction disc. As the pressure rotor deforms, the contact area between the pressure rotor and the friction disc is reduced in size to just the "high spots" on the pressure rotor. A secondary failure caused by deformation can occur when contact is made between the pressure rotor and the friction disc when the clutch is adapted to be in neutral, thereby engaging the output of the transmission when no output is desired.

Prior art braking systems have attempted to mitigate or prevent heat damage to brake rotors. Ceramic coated brake rotors can be effective at resisting heat absorption and will not warp at temperatures that would otherwise cause a metal brake rotor to deform. However, a limitation of prior art ceramic coated brake rotors is that they are expensive to produce. Metal brake rotors can be "vented" by providing, for example, a corrugated layer between the first and second sides of the brake rotor in order to provide air cooling. A limitation of prior art vented rotors is that they are larger and heavier, thereby requiring a heavier duty braking system and increasing the unsprung weight of the automobile which decreases the automobile's handling, acceleration, deceleration, and fuel efficiency. Metal brake rotors can be "cross-drilled" by drilling one or more holes in the plane of the brake rotor to allow a larger surface area for heat dissipation and for air flow through and around the brake rotor. A limitation of prior art cross-drilled rotors is that the contact area for the brake-pad-to-brake-rotor interface is decreased, thus decreasing the braking performance of the brake system.

Similarly, a rotor in a clutch pack for a transmission is subject to the same frictional forces and heat damage as is a brake rotor. Prior art rotors for transmissions are heavier to prevent warping that would adversely impact the performance of friction rotor.

Accordingly, there is a need for a rotor that is light, inexpensive, and resists warping and that can increase the efficiency of prior art systems.

SUMMARY OF THE INVENTION

According to an embodiment, a rotor can be provided that includes a substantially annular segment having a thickness defined between a first side surface and a second side surface. The substantially annular segment can include an inner end edge surface and an outer end edge surface. At least one expansion groove can be formed in the substantially annular segment, the at least one expansion groove can include a substantially straight portion and a substantially curved portion. The substantially curved portion of the at least one expansion groove can form an arc of at least about 90 degrees. The at least one expansion groove can extend at least partially through the thickness of the segment.

According to a further embodiment, a rotor can be provided that includes a substantially annular segment having a thickness defined between a first side surface and a second side surface. The substantially annular segment can include an inner end edge surface and an outer end edge surface. In addition, the substantially annular segment can include at least one expansion groove having a substantially  or  shape extending through the thickness of the segment.

According to yet another embodiment, a rotor can be provided that includes a substantially annular segment having a thickness defined between a first side surface and a second side surface. The substantially annular segment can include an inner end edge surface and an outer end edge surface. The substantially annular segment can include at least one question-mark-shaped expansion groove extending at least partially through the thickness of the segment.

According to a still further embodiment, a method of making a rotor can include providing a rotor having a substantially annular segment having a thickness defined between a first side surface and a second side surface, the substantially annular segment can include an inner end edge surface and an outer end edge surface. The method can further include forming at least one expansion groove in the substantially annular segment, the at least one expansion groove including a substantially straight portion and a substantially curved portion, the substantially curved portion forming an arc of at least about 90 degrees.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

Figure 1:
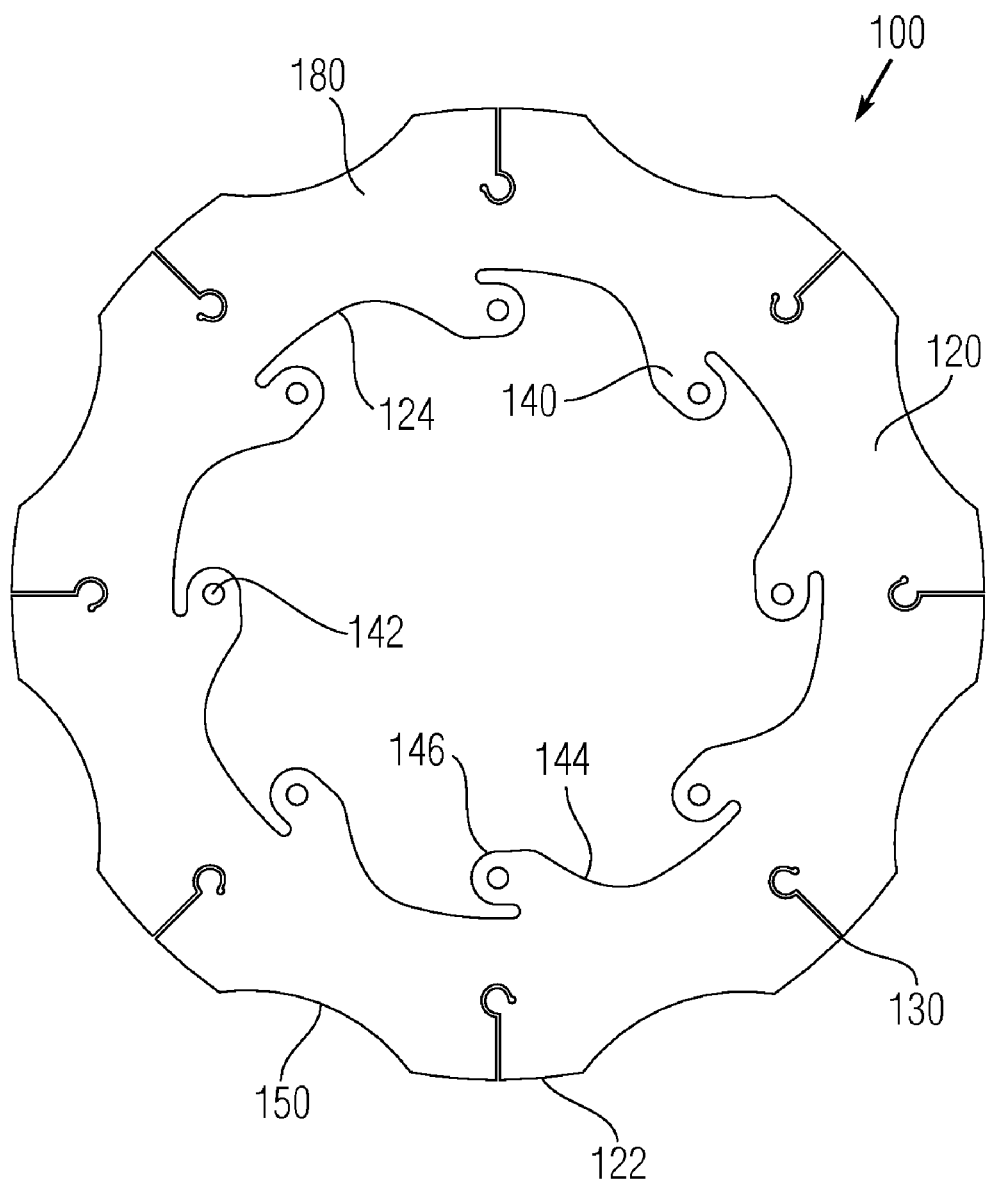
FIG. 1 depicts a top plan view of a brake rotor of an embodiment of the present teachings.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

As used herein, the term "question-mark-shaped expansion groove" means a void, a groove, a channel, a conduit, or the like, that has a substantially straight portion and a substantially curved portion, much like a question mark without the dot or "." underneath. For example, the term "question-mark-shaped expansion groove" can refer to a substantially

or shape, and the like.

As used herein, the term "annular" refers to a rotor, a portion of a rotor, or a segment of a rotor having a ring-like structure or forming a ring.

As used herein, the term "radial" means a hypothetical straight line running from a center of a rotor or segment to an outer radial end edge surface of the rotor or segment. Also as used herein, running "along a radial" or extending "along a radial" refers to a feature such as a question-mark-shaped expansion groove that can be parallel to all, or a portion of, the radial.

As used herein, the terms "distal end" and "proximal end" can refer to different ends of a feature, for example, a flange, where the term "proximal end" refers to the end of a flange that contacts or is operatively disposed with another feature of a rotor of the present teachings, such as a substantially annular segment, and the term "distal end" refers to an end of the flange that is spaced from and does not contact, or is not operatively disposed with, a substantially annular segment of a rotor.

As shown in FIGS. 1-8, a rotor 100 according to the present teachings is provided. The rotor 100 can include a substantially annular segment 120 having an outer end edge surface 122 and an inner end edge surface 124. The substantially annular segment 120 can also include a first side surface 180 and a second side surface 190, with a thickness of the substantially annular segment 120 being defined therebetween. The substantially annular segment 120 can be formed with one or more question-mark-shaped expansion grooves 130 extending at least partially, or fully, through the thickness of the substantially annular segment 120. In addition or alternatively, the substantially annular segment 120 can include one or more flanges 140 that can extend from the inner end edge surface 124 at an angle, and not parallel to, a radial of the substantially annular segment 120.

Figure 4:
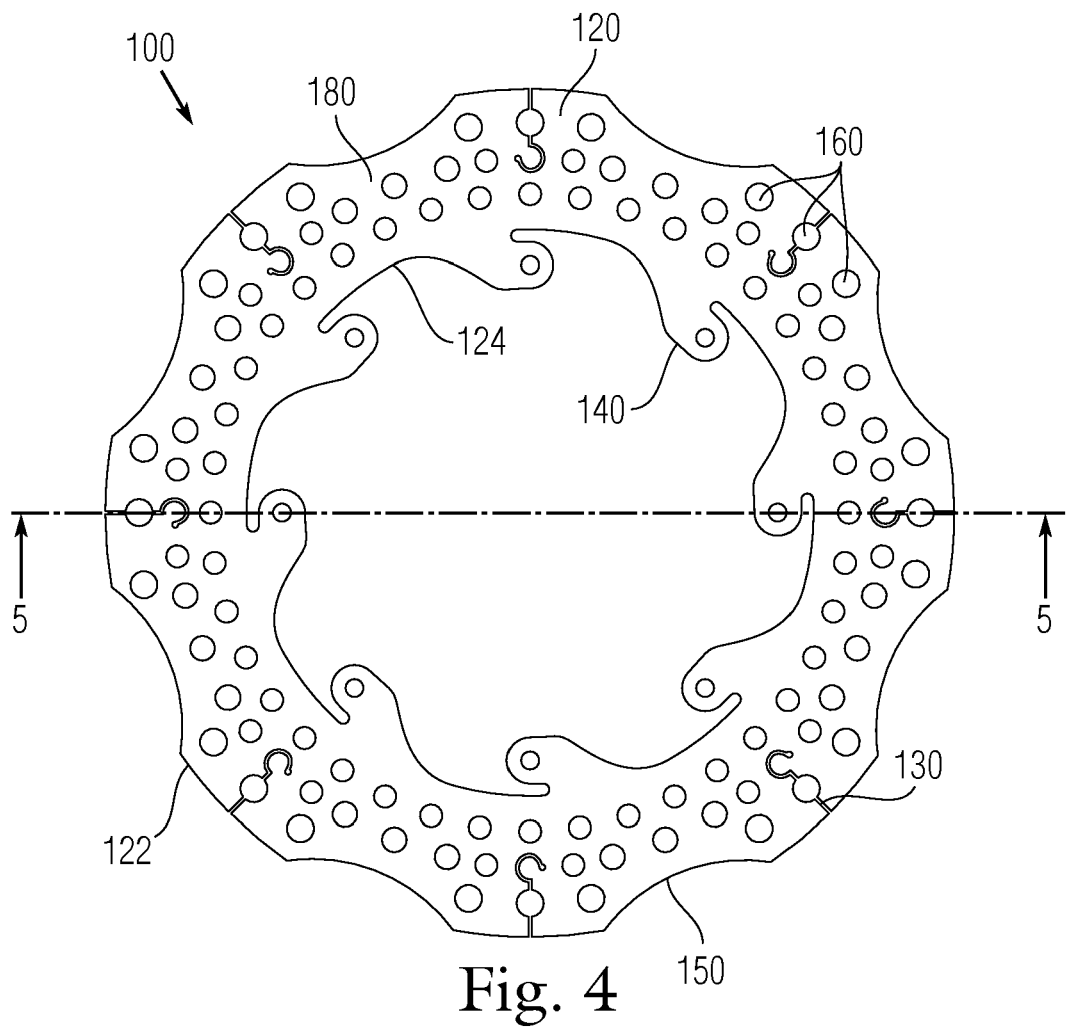
FIG. 4 depicts a top plan view of a brake rotor including cross-drilled vent holes of a further embodiment of the present teachings.
Figure 7:
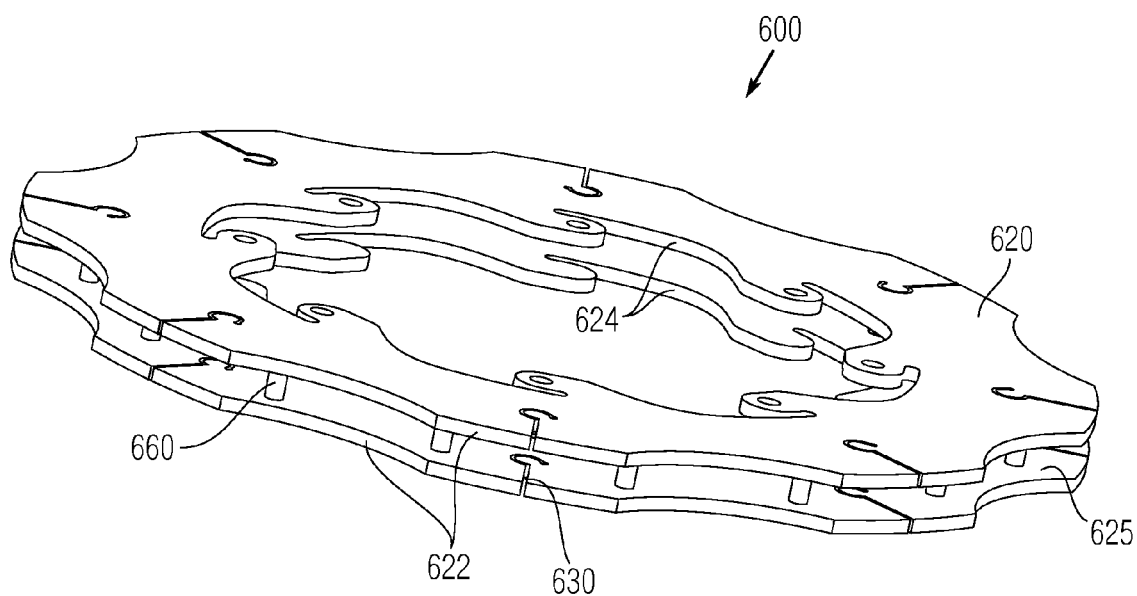
FIG. 7 depicts a perspective view of a vented brake rotor according to a still further embodiment of the present teachings.

As shown in FIGS. 1, 4, and 7, one or more of the question-mark-shaped expansion grooves 130 can generally extend from the outer end edge surface 122 of the substantially annular segment 120 substantially along a radial toward the inner end edge surface 124. One or more of the expansion grooves 130 can be arranged to extend in a different direction, such as, for example, from the inner end edge surface 124 in a substantially radial direction toward the outer end edge surface 122.

The substantially annular segment 120 can be adapted to be operatively disposed with another object, for example, a brake pad or, for further example, a friction disc. The substantially annular segment 120 can vary in size with respect to the intended application of the segment 100. For example, a rotor adapted to be used in a braking system in a passenger motor vehicle would be larger in outer diameter than a rotor adapted to be used in a clutch pack for a motor vehicle transmission. Consequently, the distance along a radial from the outer end edge surface 122 to the inner end edge surface 124 of the substantially annular segment 120 will differ. Specifically, the distance for a rotor used in a disc brake system will be greater than the distance for a rotor used in a clutch pack system.

Figure 2:
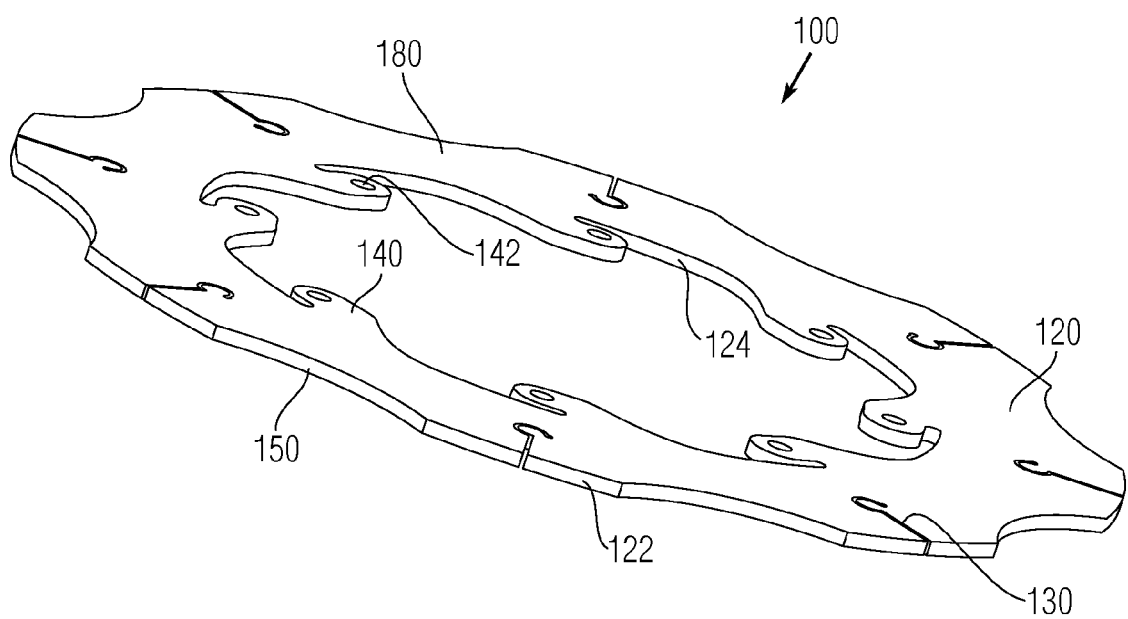
FIG. 2 depicts a perspective view of the brake rotor of FIG. 1.

FIGS. 1 and 2 show a brake rotor 100 in top plan view and a perspective view, respectively. The substantially annular segment 120 can be provided with one or more flanges 140. A flange 140 can include a distal end 146 and a proximal end 144. The proximal end 144 of the flange 140 can be operatively arranged with the substantially annular segment 120, while defining a portion of the inner end edge surface 124 thereof. The flange 140 can extend, protrude, or the like from the substantially annular segment 120. The flange 140 can extend at an angle not parallel to a radial of the rotor 100. The flange 140 can extend in a direction substantially perpendicular to the axis of rotation of the substantially annular segment 120. The flange 140 can extend in a substantially linear manner from the substantially annular segment 120. The flange 140 can flex as the flange 140 becomes hotter. For example, the flange 140 can expand as the flange 140 heats up and the flange 140 can contract as the flange 140 cools down.

One or more of the flanges 140 can include one or more attachment points 142. An attachment point 142 can be operatively disposed in the vicinity of the distal end 146 of the flange 140. The attachment point 142 can be a hole or other mounting structure such that the brake rotor can be operatively disposed on a wheel hub, or other suspension or drive train component. The attachment point 142 can be, for example, a hole with threads or a hole without threads. The attachment point 142 can be, for example, a stud operatively disposed on or in the flange 140.

One or more of the flanges 140 can be arranged to extend on substantially the same plane as the substantially annular segment 120. Alternatively, one or more of the flanges 140 can be arranged on a plane which is parallel with the substantially annular segment 120. The thickness of one or more of the flanges 140 can be the same as, or different from, the thickness of the substantially annular segment 120. The flanges 140, can be made of the same metal, metals, or metal alloy as the substantially annular segment 120. The flanges 140 can be comprised of different metal, metals, or metal alloys as the substantially annular segment 120.

The distance from the outer end edge surface 122 of the rotor 100 to the hypothetical center of the rotor 100 can vary based on the intended application of the rotor 100. For example, the distance can be greater for a rotor adapted for use with a disc brake system for a light truck than for a rotor adapted for use with a disc brake system for a lightweight sports car. Also, for example, the distance can be greater for a rotor adapted for use on or with the front axle or wheels of a vehicle than for a rotor adapted for use on or with the rear axle or wheels of the same vehicle. For example, the distance can be from about six (6) inches to about eighteen (18) inches. The distance from the outer end edge surface 122 of the rotor 100 to the hypothetical center of the rotor 100 can be from about ten (10) inches to about fourteen (14) inches, or for further example, about twelve (12) inches for a passenger motor vehicle.

The distance along a radial from the outer end edge surface 122 of the substantially annular segment 120 to the inner end edge surface 124 of the substantially annular segment 120 can vary based on the intended application of the rotor 100. For example, the distance can be greater for a rotor adapted for use with a disc brake system for a light truck than for a rotor adapted for use with a disc brake system for a lightweight sports car. Also, for example, the distance can be greater for a rotor adapted for use on or with the front axle or wheels of a vehicle than for a rotor adapted for use on or with the rear axle or wheels of the same vehicle. For example, the distance can be from about one (1) inch to about three (3) inches. The distance along a radial from the outer end edge surface 122 of the substantially annular segment 120 to the inner end edge surface 124 of the substantially annular segment 120 can be from about one and a half (1½) inches to about two and a half (2½) inches, or for further example, about two (2) inches for a passenger motor vehicle.

Figure 3:
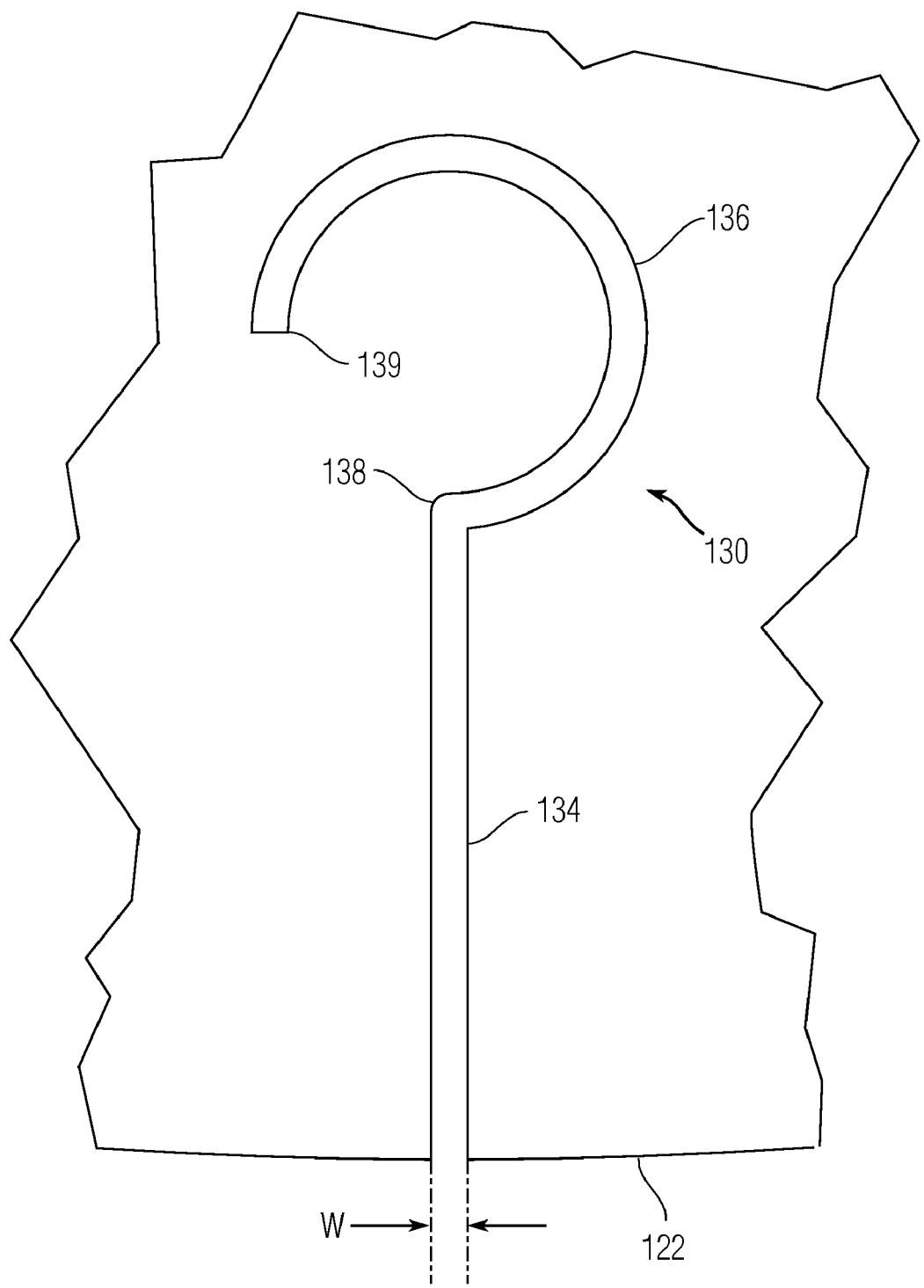
FIG. 3 depicts a top plan, close-up view of an expansion groove that can be formed in a substantially annular segment of a rotor of the present teachings.

As shown in FIG. 3, an expansion groove 130 can include a substantially straight portion 134 and a substantially curved portion 136.

The substantially straight portion 134 can extend from an outer end edge surface 122 of the substantially annular segment 120 towards the center of the substantially annular segment 120. The length of the substantially straight portion 134 of the question-mark-shaped expansion groove can be approximately one-third of the shortest radial distance between the inner end edge surface 124 and the outer end edge surface 122 of the substantially annular segment 120. The substantially curved portion 136 of the question-mark-shaped expansion groove 130 can be operatively disposed between the outer end edge surface 122 and the inner end edge surface 124. For example, the substantially curved portion 136 can be operatively disposed equidistant from the outer end edge surface 122 and the inner end edge surface 124. For further example, the substantially curved portion 136 can be operatively disposed at the location of the greatest heat build-up from the interface of the first side surface and the second side surface of the substantially annular segment 120 and, for example, brake pads.

Preferably, the substantially curved portion 136 of the question-mark-shaped expansion groove 130 can form an arc of about 270 degrees from the end of the substantially straight portion 134 of the question-mark-shaped expansion groove. However, the substantially curved portion 136 of the question-mark-shaped expansion groove 130 can form an arc of less than about 270 degrees.

The width, W, of the channel defined by the question-mark-shaped expansion groove 130 can be constant throughout the length of the substantially straight portion 134 and substantially curved portion 136 of a question-mark-shaped expansion groove 130. However, the width, W, of the channel can vary along such a length or lengths of a question-mark-shaped expansion groove 130.

The ratio of the length of the substantially straight portion 134 of the question-mark-shaped expansion groove 130 to the length of the substantially curved portion 136 can be, for example, about 1:1, about 2:1, about 3:1, about 4:1, about 5:1, about 6:1, and the like. The length of the substantially curved portion 136 of the groove 130 can be measured, for example, from the beginning 138 of the substantially curved portion 136 to the end 139 thereof, along a mid-point of the width, W, of the channel.

The substantially curved portion 136 of the expansion grooves 130 can form an arc that is slightly curved, mostly curved, or somewhat curved. For example, the arc can extend about 90 degrees, about 180 degrees, about 270 degrees, or more, or variations in between. The radius of curvature of the curved portion 136 can be constant or it can vary along the length thereof. For example, the substantially curved portion 136 can have a decreasing radius of curvature or the substantially curved portion 136 can have an increasing radius of curvature.

The end 139 of the substantially curved portion 136 can be bulbous, squared off, have a rounded end, or the like.

The width, W, of the channel of the expansion groove 130 can be proportional to the length of the substantially straight portion 134. For example, the ratio of the length of the substantially straight portion 134 to the width, W, can be 100:1; 50:1, 40:1, 30:1, and the like. The ratio of the length of the substantially straight portion 134 to the width, W, can be greater than 100:1 or less than 30:1. The width, W, of the channel of the question-mark-shaped expansion groove 130 can be, for example, from about 2 mm to about 10 mm. The width, W, of the channel of the question-mark-shaped expansion groove can be constant or the width can vary. For example, the width, W, of the substantially straight portion 134 can be greater than the width of the substantially curved portion 136.

The substantially annular segment 120 can be formed with one or more question-mark-shaped expansion grooves 130 that can extend just partially through the plane of the substantially annular segment 120. Two or more question-mark-shaped expansion grooves 130 can be spaced close together, or far apart, relative to the surface area of the substantially annular segment 120. When a question-mark-shaped expansion groove 130 does not extend through the plane of the substantially annular segment, the question-mark-shaped expansion groove 130 can be located on either side surface 180, 190 or both side surfaces 180, 190 of the substantially annular segment 120.

One or more of the question-mark-shaped expansion grooves 130 can start at the outer end edge surface 122 of the substantially annular segment 120. Two or more of the question-mark-shaped expansion grooves 130 can be of differing or variable lengths, or two or more of the question-mark-shaped expansion grooves 130 can be the same length. The length of the question-mark-shaped expansion grooves 130 can be proportional to a length from the outer end edge surface 122 of the substantially annular segment 120 to the inner end edge surface 124 of the substantially annular segment 120. For example, the proportion can be 1:5, 1:4, 1:3, 1:2, or the like.

The outer end edge surface 122 of the substantially annular segment 120 can be formed with one or more scallops 150. The scallops 150 can serve to decrease weight without significantly reducing the functional surface area of the annular segment 120. Two or more scallops 150 can be located in a spaced relationship along the periphery of the annular segment 120 such that the scallops 150 act to counterbalance the substantially annular segment 120. The substantially annular segment 120 can include an odd number of scallops 150, or an even number of scallops 150.

As shown in FIG. 4, the substantially annular segment 120 can also include one or more cross-drilled vent holes 160. The cross-drilled vent holes 160 can be located anywhere on the substantially annular segment 120. For example, the substantially annular segment 120 can include cross-drilled vent holes 160 that are co-located with a portion of a question-mark-shaped expansion groove 130. For further example, cross-drilled vent holes 160 can be located near the inner end edge surface 124, the outer end edge surface 122, and/or on the flanges 140. For further example, a cross-drilled vent hole 160 can be located near, can encompass, or can be co-located with any portion of a question-mark-shaped expansion groove 130.

The diameters of the cross-drilled vent holes 160 can vary, for example, based on the anticipated application of the brake rotor 100. For further example, a cross-drilled vent hole 160 located near the inner end edge surface 124 of the annular segment 120 can be formed smaller than the diameter of the cross drilled vent hole 160 near the outer end edge surface 122.

One or more of the question-mark-shaped expansion grooves 130 can be formed with additional features found within or on the substantially annular segment 120. For example, a cross-drilled vent hole 160 can be over-laid or located within the structure of a question-mark-shaped expansion groove 130. A cross-drilled vent hole 160 can be located within the substantially straight portion 134 of a question-mark-shaped expansion groove 130, as shown in FIG. 4. For further example, a question-mark-shaped expansion groove 130 can run along a hypothetical line that passes through a hypothetical center of a cross-drilled vent hole 160.

One or more of the question-mark-shaped expansion grooves 130 can contain a filler material having a different melting point than that of the substantially annular segment 120. For example, the filler material can deform or soften at a lower temperature than the substantially annular segment 120, such that the material comprising the substantially annular segment 120 would expand at a slower rate than if the question-mark-shaped expansion groove was a void.

Figure 5:
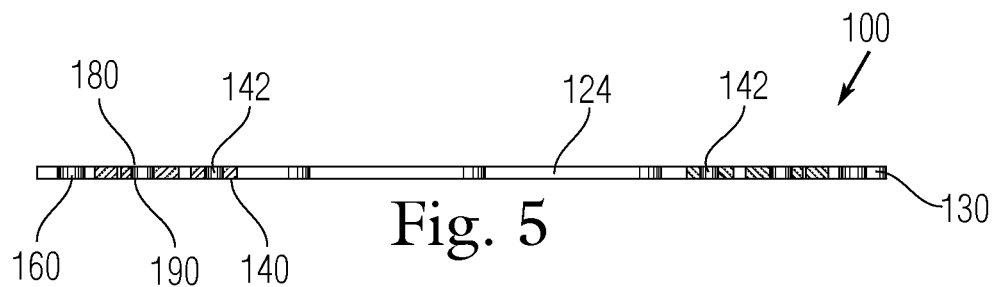
FIG. 5 depicts a cross-sectional view of the brake rotor of FIG. 4 taken along line 5-5 thereof.

FIG. 5 shows a cross-sectional view of the rotor 100 taken along line 5-5 of FIG. 4. A cross-drilled vent hole 160 is shown operatively disposed within the question-mark-shaped expansion groove 130. An attachment point 142 is shown operatively disposed within a flange 140.

Figure 6:
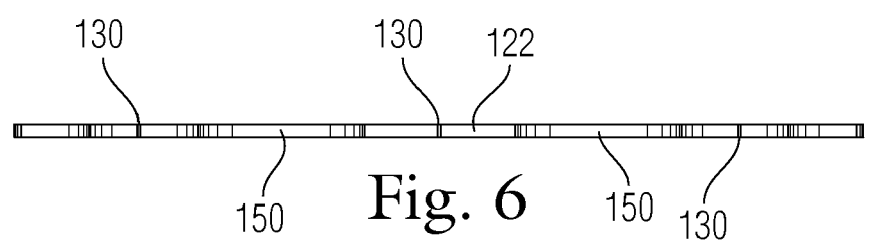
FIG. 6 depicts a side view of the brake rotor of FIG. 4.

FIG. 6 shows a side view of the rotor 100 shown in FIG. 5. Question-mark-shaped expansion grooves 130 are shown where they meet the outer end edge surface 122 of the substantially annular segment 120. Scallops 150 are also shown operatively disposed on the outer end edge surface 122 of the substantially annular segment 120.

Referring to FIG. 7, a vented rotor 600 is shown and can include at least two substantially annular segments 620, 625. Each of the substantially annular segments 620, 625 define an outer end edge surface 622 and an inner end edge surface 624, and are formed with at least one question-mark-shaped expansion groove 630 extending through a plane of the respective substantially annular segments 620, 625. The two substantially annular segments 620, 625 can be supported approximately parallel to each other by way of one or more supports 660. The one or more supports 660 can be any conventional support for providing spaced venting between the annular segments 620, 625. The one or more supports 660 can be adapted to operatively assist, promote, enhance, or the like, airflow between the first substantially annular segment 620 and the second substantially annular segment 625.

Figure 8:
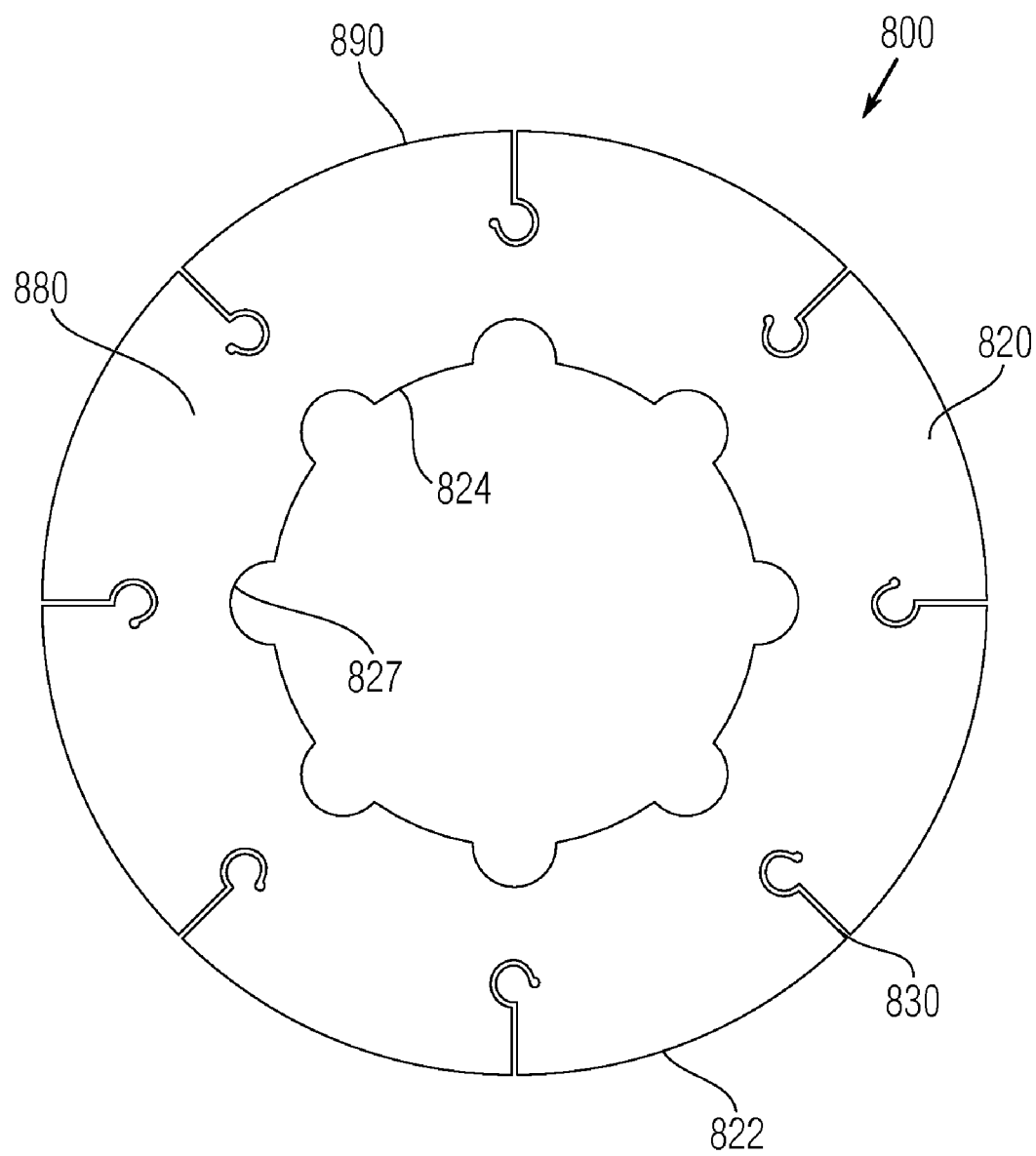
FIG. 8 depicts a top plan view of a pressure rotor according to various embodiments of the present teachings.

Referring to FIG. 8, a rotor 800 is shown. The rotor 800 can be used as, for example, a pressure rotor for a clutch pack utilized as a drivetrain component operatively disposed within a transmission. The rotor 800 can include a substantially annular segment 820. The substantially annular segment 820 can include an outer end edge surface 822 and an inner end edge surface 824. The substantially annular segment 820 can also include a first side surface 880 and a second side surface 890, with a thickness of the substantially annular segment 820 being defined therebetween.

The distance from the outer end edge surface 822 of the rotor 800 to the hypothetical center of the rotor 800 can vary based on the intended application of the rotor 800. For example, the distance can be greater for a rotor adapted for use within a drivetrain system for a light truck than for a rotor adapted for use within a drivetrain system for a lightweight sports car. For example, the distance can be from about two (2) inches to about six (6) inches. The distance from the outer end edge surface 122 of the rotor 800 to the hypothetical center of the rotor 800 can be from about three (3) inches to about five (5) inches, or for further example, from about four (4) inches to about four and a half (4½) inches for a passenger motor vehicle.

The distance along a radial from the outer end edge surface 822 of the substantially annular segment 820 to the inner end edge surface 824 of the substantially annular segment 820 can vary based on the intended application of the rotor 800. For example, the distance can be greater for a rotor adapted for use within a drivetrain system for a light truck than for a rotor adapted for use within a drivetrain system for a lightweight sports car. For example, the distance can be from about a quarter (0.25) inch to about three (3) inches. The distance along a radial from the outer end edge surface 822 of the substantially annular segment 820 to the inner end edge surface 824 of the substantially annular segment 820 can be from about a half (0.5) inch to about one and a half (1½) inches, or for further example, about one (1) inch for a passenger motor vehicle.

The substantially annular segment 820 can be formed with one or more question-mark-shaped expansion grooves 830 extending at least partially, or fully, through the thickness of the substantially annular segment 820. The inner end edge surface 824 can be adapted to be operatively disposed with another component of a machine, for example, an output shaft of a transmission. The inner end edge surface 824 can include at least one lobe 827 such that the at least one lobe 827 engages an output shaft such that when the rotor 800 rotates, the output shaft rotates with the rotor 800. The lobe 827 can be collocated or integrally formed with the inner end edge surface 824, or the like. The lobe 827 can be, in addition to or instead of a lobe, a tooth or the like.

The rotor 800 can be adapted to be operatively disposed against a friction surface, such as that found in a clutch pack of a transmission.

As the rotor 100 heats up during braking, the rotor expands. As the rotor 100 expands, the question-mark-shaped expansion grooves 130 close or expand until the walls thereof meet, interlocking the segments of the rotor 100 into a unified structure. As the rotor 100 expands, the flanges 140 also expand. The flanges 140 expand approximately perpendicularly to the axis of rotation of the rotor 100. Expansion of the flanges 140 can lead to circumferential advancement or retardation of the rotor 100. The rotor 100 can circumferentially advance or retard depending on the mounting orientation of the rotor 100. Specifically, if the distal end 146 of the flange 140 trails the rotation of the flange 146, the rotor 100 can be circumferentially advanced as the flange 140 expands. If the distal end 146 of the flange 140 leads the rotation of the flange 140, the rotor 100 can be circumferentially retarded as the flange 140 expands. By providing a structure which leads to the controlled expansion of the rotor 100, any potential warpage or deformation of the rotor 100 can be reduced or substantially eliminated when the rotor 100 is subject to excessive heating.

According the various embodiments, the rotor 100, 600, 800 of the present teachings can be made out of any suitable material. For example, the rotor 100, 600, 800 can be made from iron, titanium, an iron alloy, a titanium alloy, steel, a steel alloy, a ceramic, a composite, or the like, or combinations thereof. The steel alloy can be, for example, alloy 1018 mild steel, ASTM A36 mild steel, 1144 steel, 12L14 fee machining steel, A366/1008 ASTM A366 (alloy 1008) steel, ASTM A513 (alloy 1020-1026) steel, or combinations thereof. The titanium can be, for example, grade 2, or CP-2, titanium.

The substantially annular segment 120 can be cut from a sheet of steel alloy. For example, the substantially annular segment 120 can be manufactured using a machine tool driven by computer numerical control (CNC). The substantially annular segment 120 can be cut using a laser, a water jet cutter, or the like. The substantially annular segment 120 can also be cast or forged.

The flanges 140 can be cut, cast or forged separately from, or together with, the substantially annular segment 120. For example, the attachment point 142 operatively disposed in flange 140 can be laser cut and then threads can be provided by a tap and die system. The rotor 100 can be a unitary device or a monolithic structure. The rotor 100 can be a component device or structure. The substantially annular segment 120 can be vented, cross-drilled, or both.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A brake or clutch rotor, comprising:
   a substantially annular segment having a thickness defined between a first side surface and a second side surface, the substantially annular segment including an inner end edge surface and an outer end edge surface; and
   at least one expansion groove formed in the substantially annular segment and extending from the outer end edge surface, the at least one expansion groove having a question-mark shape including a substantially straight portion and a substantially curved portion;
   wherein the substantially curved portion of the at least one expansion groove forms an arc of at least about 90 degrees;
   wherein the substantially straight portion and the substantially curved portion of the expansion groove are configured to close as the brake or clutch rotor heats up during braking; and
   wherein the at least one expansion groove extends at least partially through the thickness of the substantially annular segment.

2. The brake or clutch rotor of claim 1, further comprising at least one flange extending from the inner end edge surface, the at least one flange extending substantially at an angle with respect to a radial outward direction of the substantially annular segment.

3. The brake or clutch rotor of claim 2, wherein the at least one flange includes an attachment point hole.

4. The brake or clutch rotor of claim 1, further comprising at least one lobe operatively disposed with the inner end edge surface.

5. The brake or clutch rotor of claim 1, wherein the substantially straight portion of the at least one expansion groove extends substantially radially inwardly in a direction from the outer end edge surface to the inner end edge surface of the substantially annular segment.

6. The brake or clutch rotor of claim 5, further comprising at least one vent hole co-located with the substantially straight portion of the at least one expansion groove.

7. The brake or clutch rotor of claim 1, wherein the substantially annular segment includes a plurality of vent holes.

8. The brake or clutch rotor of claim 1, wherein the outer end edge surface of the substantially annular segment defines a plurality of scallops.

9. The brake or clutch rotor of claim 1, further comprising a second substantially annular segment having a thickness defined between a first side surface and a second side, and at least one expansion groove extending at least partially through the thickness of the second segment, wherein the first and second substantially annular segments are supported in a spaced and substantially parallel relationship with one another by way of at least one support.

10. The brake or clutch rotor of claim 1, wherein the distance along a radial from the outer end edge surface of the substantially annular segment to the inner end edge surface of the substantially annular segment is between from about a half (0.5) inch to about one and a half (1½) inches.

11. The brake or clutch rotor of claim 1, wherein the distance along a radial from the outer end edge surface of the substantially annular segment to the inner end edge surface of the substantially annular segment is about one (1) inch.

12. The brake or clutch rotor of claim 1, wherein the distance along a radial from the outer end edge surface of the substantially annular segment to the inner end edge surface of the substantially annular segment is from about one (1) inch to about three (3) inches.

13. The brake or clutch rotor of claim 1, wherein the distance along a radial from the outer end edge surface of the substantially annular segment to the inner end edge surface of the substantially annular segment is about two (2) inches.

14. A brake or clutch rotor, comprising:
   a substantially annular segment having a thickness defined between a first side surface and a second side surface, the substantially annular segment including an inner end edge surface and an outer end edge surface;
   wherein the substantially annular segment includes at least one expansion groove having a question-mark shape including a substantially straight portion and a substantially curved portion extending through the thickness of the substantially annular segment; and wherein a width of a channel defined by the at least one question-mark-shaped expansion groove is substantially constant throughout a length of the substantially straight portion and the substantially curved portion of the at least one question-mark-shaped expansion groove.

15. The brake or clutch rotor of claim 14, further comprising at least one flange extending from the inner end edge surface, the at least one flange extending substantially at an angle with respect to a radial outward direction of the substantially annular segment.

16. The brake or clutch rotor of claim 15, wherein the at least one flange includes an attachment point hole.

17. The brake or clutch rotor of claim 14, further comprising at least one lobe operatively disposed with the inner end edge surface.

18. The brake or clutch rotor of claim 14, wherein the substantially straight portion of the at least one expansion groove extends substantially radially inwardly in a direction from the outer end edge surface to the inner end edge surface of the substantially annular segment.

19. The brake or clutch rotor of claim 18, further comprising at least one vent hole co-located with the substantially straight portion of the least one expansion groove.

20. The brake or clutch rotor of claim 15, wherein the substantially annular segment includes a plurality of vent holes.

21. The brake or clutch rotor of claim 15, wherein the outer end edge surface of the substantially annular segment defines a plurality of scallops.

22. The brake or clutch rotor of claim 14, further comprising a second substantially annular segment having a thickness defined between a first side surface and a second side, and at least one expansion groove extending through the thickness of the second substantially annular segment, wherein the first and second substantially annular segments are supported in a spaced and substantially parallel relationship with one another by way of at least one support.

23. The brake or clutch rotor of claim 14, wherein the distance along a radial from the outer end edge surface of the substantially annular segment to the inner end edge surface of the substantially annular segment is between from about a half (0.5) inch to about one and a half (1½) inches.

24. The brake or clutch rotor of claim 14, wherein the distance along a radial from the outer end edge surface of the substantially annular segment to the inner end edge surface of the substantially annular segment is about one (1) inch.

25. The brake or clutch rotor of claim 14, wherein the distance along a radial from the outer end edge surface of the substantially annular segment to the inner end edge surface of the substantially annular segment is from about one (1) inch to about three (3) inches.

26. The brake or clutch rotor of claim 14, wherein the distance along a radial from the outer end edge surface of the substantially annular segment to the inner end edge surface of the substantially annular segment is about two (2) inches.

27. A brake or clutch rotor, comprising:
a substantially annular segment having a thickness defined between a first side surface and a second side surface, the substantially annular segment including an inner end edge surface and an outer end edge surface;
wherein the substantially annular segment includes at least one question-mark-shaped expansion groove extending at least partially through the thickness of the substantially annular segment; and
wherein the at least one question-mark-shaped expansion groove is configured to close as the brake or clutch rotor heats up during braking.

28. The brake or clutch rotor of claim 27, further comprising at least one flange extending from the inner end edge surface, the at least one flange extending substantially at an angle with respect to a radial outward direction of the substantially annular segment.

29. The brake or clutch rotor of claim 27, further comprising at least one lobe operatively disposed with the inner end edge surface.

30. The brake or clutch rotor of claim 27, wherein the at least one question-mark-shaped expansion groove includes a substantially straight portion and a substantially curved portion, the substantially straight portion extending substantially radially inwardly in a direction from the outer end edge surface to the inner end edge surface of the substantially annular segment.

31. A method of making a brake or clutch rotor, comprising:
providing a substantially annular segment having a thickness defined between a first side surface and a second side surface, the substantially annular segment including an inner end edge surface and an outer end edge surface; and
forming at least one expansion groove having a question-mark shape in the substantially annular segment and extending from the outer end edge surface, the at least one expansion groove including a substantially straight portion and a substantially curved portion and each portion being configured to close as the brake or clutch rotor heats up during braking, the substantially curved portion forming an arc of at least about 90 degrees.

32. The method of making the brake or clutch rotor of claim 31, further comprising co-locating at least one vent hole with the substantially straight portion of the at least one expansion groove.

33. The method of making the brake or clutch rotor of claim 31, further comprising forming at least one flange extending from the inner end edge surface, the at least one flange extending substantially at an angle with respect to a radial outward direction of the substantially annular segment.

34. The method of making the brake or clutch rotor of claim 31, further comprising forming at least one lobe operatively disposed with the inner end edge surface.

35. The method of making the brake or clutch rotor of claim 31, wherein the distance along a radial from the outer end edge surface of the substantially annular segment to the inner end edge surface of the substantially annular segment is between from about a half (0.5) inch to about one and a half (1½) inches.

36. The method of making the brake or clutch rotor of claim 31, wherein the distance along a radial from the outer end edge surface of the substantially annular segment to the inner end edge surface of the substantially annular segment is about one (1) inch.

37. The method of making the brake or clutch rotor of claim 31, wherein the distance along a radial from the outer end edge surface of the substantially annular segment to the inner end edge surface of the substantially annular segment is from about one (1) inch to about three (3) inches.

38. The method of making the brake or clutch rotor of claim 31, wherein the distance along a radial from the outer end edge surface of the substantially annular segment to the inner end edge surface of the substantially annular segment is about two (2) inches.

\* \* \* \* \*